UNITED STATES PATENT OFFICE.

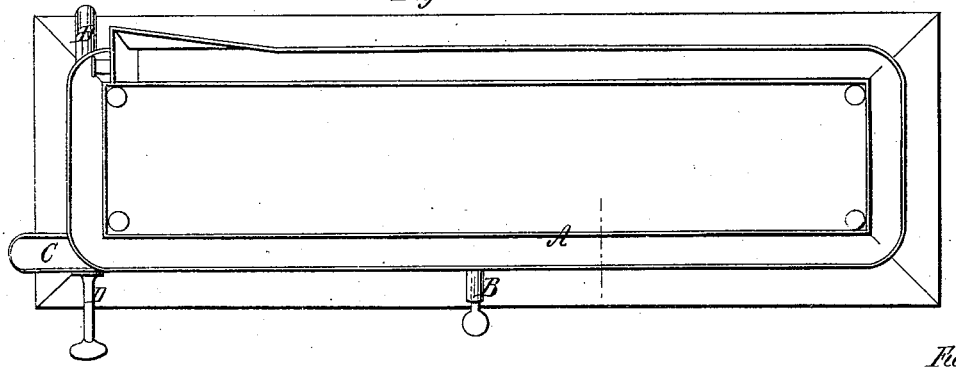
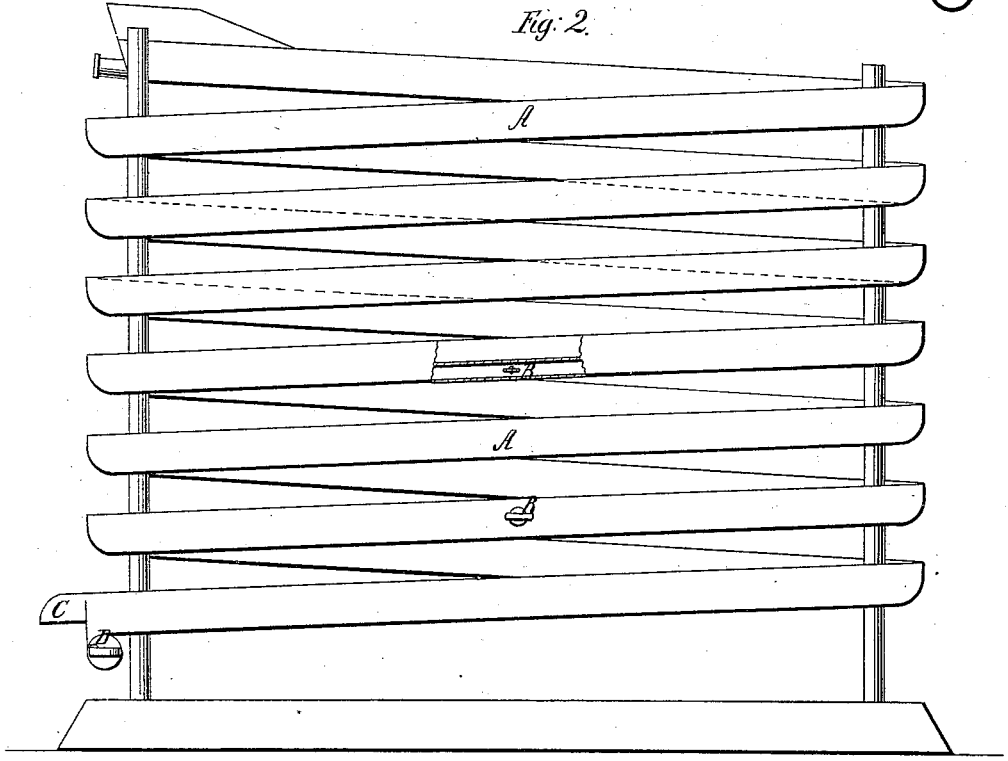

PHILIPP REUTLINGER AND ALBIN HERBERT, OF WILLIAMSBURG, N. Y.

IMPROVED LIQUID-COOLER.

Specification forming part of Letters Patent No. 54,016, dated April 17, 1866.

*To all whom it may concern:*

Be it known that we, PHILIPP REUTLINGER and ALBIN HERBERT, of Williamsburg, in the county of Kings and State of New York, have invented a new and Improved Liquid-Cooler; and we do hereby declare that the following is a full, clear, and exact description thereof, which will enable those skilled in the art to make and use the same, reference being had to the accompanying drawings, forming part of this specification, in which—

Figure 1 represents a plan or top view of this invention. Fig. 2 is a sectional side elevation of the same. Fig. 3 is a transverse section of the double trough.

Similar letters of reference indicate corresponding parts.

This invention consists in the arrangement of a double trough brought in the form of an open coil, in combination with suitable valves inserted in the lower half of said trough in such a manner that two liquids, one to be cooled and the other to exert a cooling influence, can be passed simultaneously through said trough, the cooling-liquid through the upper and the liquid to be cooled through the lower part thereof, and that by means of the valves the speed of the liquid to be cooled can be adjusted so that the same runs down slower than the cooling-liquid and any desired degree of cooling effect can be obtained.

A represents a double trough, which is brought in the form of an open coil, as clearly shown in the drawings, so that the liquid poured in the upper end of said trough will run down through it and discharge at its bottom end. The outer or upper half of the trough is open and about one-third larger than the lower closed part thereof, as shown in Fig. 3, so that the cooling-liquid passing down through the outer half will be capable of absorbing the heat from the liquid to be cooled, which passes down through the lower half of the trough.

The speed of the liquid to be cooled, as the same descends through the lower half of the trough, is regulated by means of one or more valves, B, which are applied at certain intervals, and which serve to close more or less said lower portion of the trough. By this arrangement the liquid to be cooled can be made to run down much slower than the cooling-liquid and any desired degree of cooling effect can be obtained.

The cooling-liquid discharges through the spout C, and the liquid to be cooled through the spout D, which is provided with a suitable faucet and so arranged that a hose can be attached to it for the purpose of removing the cooled liquid.

This liquid-cooler is particularly intended for brewers of beer and other liquors, and the hot beer on being passed through the lower half of the trough can be cooled with the greatest ease and facility, ice-water being employed as the cooling liquid.

The lower half of the trough is readily cleaned by blowing steam through it or by means of soda-water, if desired.

What we claim as new, and desire to secure by Letters Patent, is—

The arrangement of the double trough A, formed in an open coil, in combination with regulating-valves B, constructed and operating substantially as and for the purpose described.

PHILIPP REUTLINGER.
ALBIN HERBERT.

Witnesses:
M. M. LIVINGSTON,
W. HAUFF.